May 27, 1958 J. MARTIN 2,836,222
ADJUSTABLE SEAT FOR AN AIRCRAFT
Filed Sept. 1, 1954 2 Sheets-Sheet 1

INVENTOR
JAMES MARTIN
per Worth Wade
Attorney.

May 27, 1958  J. MARTIN  2,836,222
ADJUSTABLE SEAT FOR AN AIRCRAFT
Filed Sept. 1, 1954  2 Sheets-Sheet 2

INVENTOR
JAMES MARTIN
per Worth Wade
Attorney.

United States Patent Office 2,836,222
Patented May 27, 1958

2,836,222

ADJUSTABLE SEAT FOR AN AIRCRAFT

James Martin, Denham, near Uxbridge, England

Application September 1, 1954, Serial No. 453,515

Claims priority, application Great Britain
September 4, 1953

1 Claim. (Cl. 155—5)

The invention relates to adjustable seats for aircraft, in particular, ejection seats of the type which is adapted to be launched from an aircraft with the occupant seated therein and mechanism is provided by which the seat is launched from the aircraft by means of an ejection unit actuated by an applied force, for example, by pressure generated by one or more explosive cartridges.

One form of ejection seat to which the invention is particularly adapted comprises a main frame on which the seat is mounted, an ejection gun operating to eject the seat and its frame along guide means fixed in the aircraft, a drogue or drogues, harness, harness release mechanism, and means operable as the seat is ejected from the aircraft to carry out automatically and in correct sequence and timing the operations necessary to allow a pilot to descent on a main parachute. There is provided a blind or screen which is adapted to be drawn into position over the face of the pilot before, and to remain in position during, the launching of the seat and its occupant from the aircraft. Means are provided interconnecting the blind or screen with the firing mechanism of the ejection gun so that the act of drawing the blind or screen into position will actuate or release the firing mechanism of the ejection gun.

The invention is well suited for incorporation in ejection seats, forming the subject of my prior Patents Nos. 2,467,763; 2,527,020; 2,569,638; 2,638,294 and pending application Ser. No. 305,951, now U. S. Patent 2,708,083.

The present invention is directed to seat raising mechanism.

With the object of achieving simplicity and lightness of construction of a seat there is employed an arrangement of seat adjustment which does not take the loads imposed by ejection of the seat.

With this arrangement it becomes possible to reduce the weight of the seat per se, while at the same time it possesses the rigidity required. The seat may be made of a comparatively light weight metal.

According to the present invention there is provided seat raising mechanism so that the seat comprising the pan and back can be adjusted to various positions relatively to the seat main frame, comprising sliding members on the seat running on guides on the seat main frame, a member built into or connected to the seat and actuated by a hand lever attached thereto, lever and link motions connecting the member on the seat and the seat main frame, and means for locking the seat in the desired selected position.

The accompanying drawings illustrate an example of carrying into effect the invention.

Figure 1:
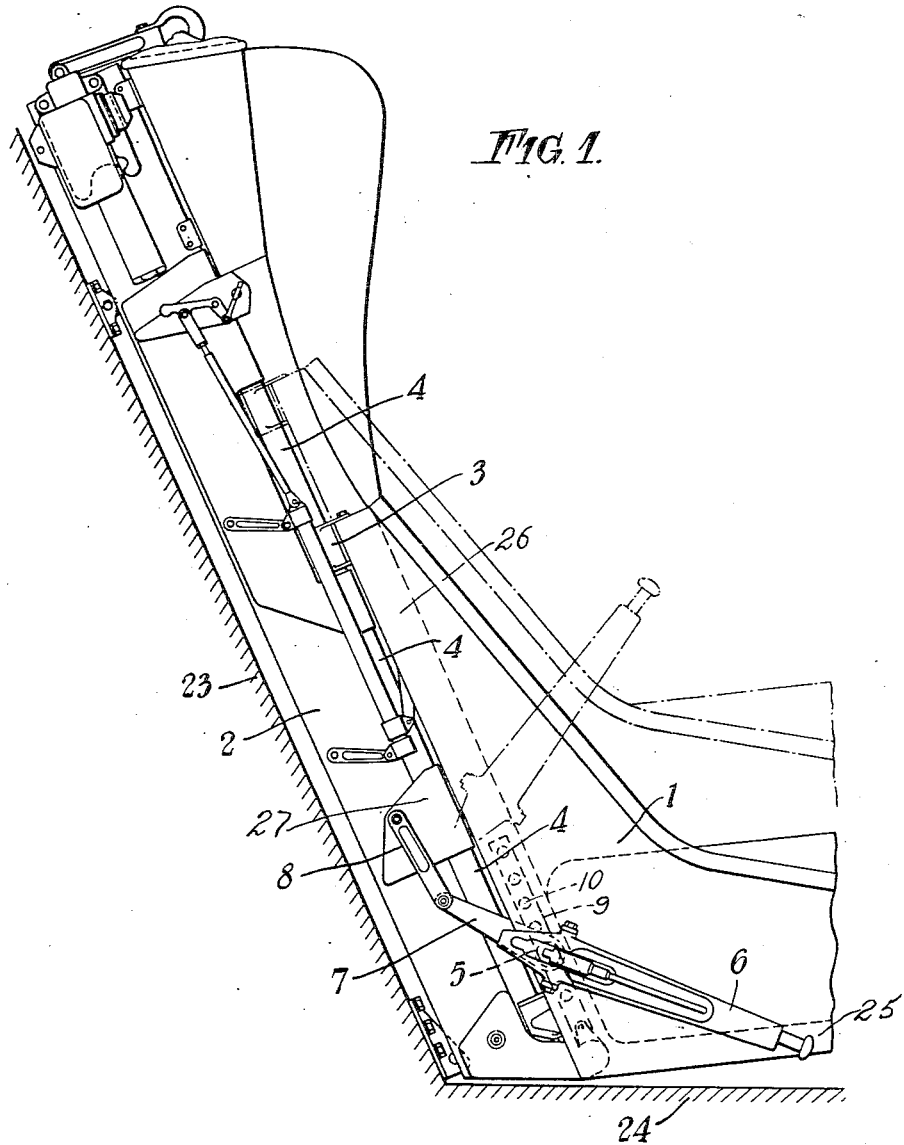
Fig. 1 is a side elevation of a seat and seat adjustment mechanism.
Figure 3:
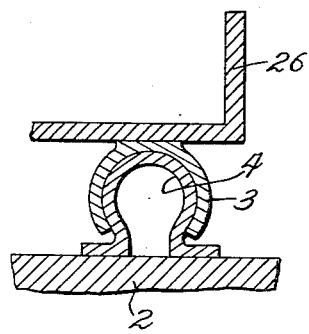
Fig. 3 is a top view in section of the seat back, the sleeves and runners of the seat.

Referring to the drawings the seat 1 comprising the pan 25 and back 26 is mounted on the seat main frame as to permit movement of the seat relatively to the seat main frame 2 providing sliding sleeves or runners 3 on the seat running upon guide members 4 built into or secured to the seat main frame 2.

A seat raising cross tube or countershaft 5 built into the seat back 26 is fitted at one end with a hand lever 6 and has a rearwardly projecting lever or levers 7. The rear end of this lever or levers is or are pivoted to a link or links 8 pivoted to a bracket 27 fixed to the seat main frame 2. These links provide latitude for arcing of the end 7 of the lever 6 during the operation of raising or lowering the seat.

The lower position of the seat is shown in full line and the upper position in dotted line in Fig. 1. It will be understood that the seat may be positioned at various heights between these upper and lower limits.

Figure 2:
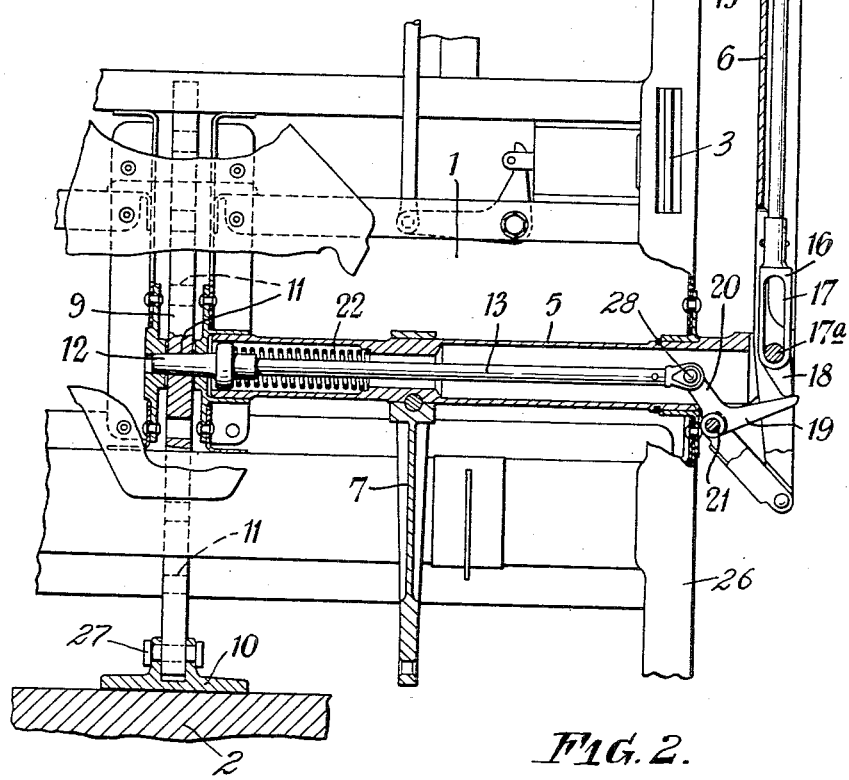
Fig. 2 is a view on an enlarged scale of part of the mechanism, but with the seat main frame removed and with the hand lever and projecting lever in vertical position for clarity.

Now referring more particularly to Fig. 2, to lock the seat in the desired selected position there is provided a pin and hole adjustment consisting of a vertical bar 9 secured at its lower end to a lug 10 by a bolt 27, the lug being secured to the main frame 2 having a series of holes 11 co-operating with a locking pin 12 on a push rod 13. This push rod 13 is housed within the seat raising cross tube 5.

From Fig. 2 it will be seen that the locking pin of the push rod is engaging one of the series of holes 11 in the member 9.

The push rod 13 is actuated from a press knob or thumb member 14 on a rod 15, the upper end of which is housed within the hand lever 6. The lower end of the rod 15 is connected to a fitting 16 which is slotted at 17 and slides about a fixed bolt 17a secured to the lever 6. The fitting 16 has a nose 18 bearing on one arm of a bell crank 19 the other arm 20 being secured by bolt 28 to the push rod 13. The bell crank is fulcrumed by bolt 21 which is mounted on seat back 26.

To permit movement of the seat the push rod 13 would be retracted against a spring 22 surrounding the rod 13 to withdraw the locking pin 12 from the particular hole 11 in the member 9 with which it is engaging. The pin is withdrawn by depressing the knob 14, after which the hand lever 6 would now be moved. The end 7 of the hand lever is pivoted to the guide 4 by connection through the link 8 to the fixed bracket 27 mounted on the guide 4 and thus movement of the lever 6 causes the seat to be raised or lowered by the cross tube 5 to the desired position, the sliding sleeves or runners 3 running along the guides 4 of the seat main frame 2.

The aircraft bulkhead is indicated by 23 and the cockpit floor by 24.

It will be apparent that the invention can be variously modified and changed within the scope of the appended claims.

I claim:

In an aircraft, the combination of, an aircraft seat having a pan and a back, a main frame mounted on the aircraft, spaced parallel runners on said main frame, spaced sleeves on said seat back positioned to slide on said runners, locking means on said seat back to lock said seat at spaced points along said main frame said locking means comprising a vertical member fixed to said main frame and having a plurality of spaced holes therein and a spring-loaded locking pin transversely mounted on said seat back and positioned to seat in one of said holes, a hollow hand lever pivoted to said vertical seat back and having one end also pivoted to said main frame, a spring loaded plunger disposed in said lever and normally having one end extending from the free end of said lever, a bell crank positioned on said seat back between said pin and the other end of said plunger so that when the plunger is depressed it will turn said crank to force said pin from its hole in said vertical member whereupon said hand lever may be moved to another position and the plunger released to seat said pin in another hole in said vertical member.

References Cited in the file of this patent

UNITED STATES PATENTS

| | | |
|---|---|---|
| 1,786,136 | Stearman | Dec. 23, 1930 |
| 1,898,644 | Sikorsky | Feb. 21, 1933 |
| 2,383,173 | Watter | Aug. 21, 1945 |
| 2,485,111 | Robins | Oct. 18, 1949 |
| 2,527,020 | Martin | Oct. 24, 1950 |
| 2,637,369 | Demarest et al. | May 5, 1953 |

FOREIGN PATENTS

| | | |
|---|---|---|
| 853,982 | France | Dec. 23, 1939 |
| 854,183 | France | Apr. 6, 1940 |